United States Patent
Chen et al.

(10) Patent No.: US 10,582,209 B2
(45) Date of Patent: Mar. 3, 2020

(54) SUB-PREDICTION UNIT TEMPORAL MOTION VECTOR PREDICTION (SUB-PU TMVP) FOR VIDEO CODING

(71) Applicant: MEDIATEK INC., Hsinchu (TW)

(72) Inventors: Chun-Chia Chen, Hsinchu (TW);
Chih-Wei Hsu, Hsinchu (TW);
Ching-Yeh Chen, Hsinchu (TW);
Yu-Wen Huang, Hsinchu (TW)

(73) Assignee: MEDIATEK INC., Hsinchu (TW)

( * ) Notice: Subject to any disclaimer, the term of this patent is extended or adjusted under 35 U.S.C. 154(b) by 2 days.

(21) Appl. No.: 15/940,248

(22) Filed: Mar. 29, 2018

(65) Prior Publication Data
US 2018/0288430 A1 Oct. 4, 2018

Related U.S. Application Data

(60) Provisional application No. 62/478,675, filed on Mar. 30, 2017.

(51) Int. Cl.
*H04N 19/51* (2014.01)
*G06F 16/783* (2019.01)
(Continued)

(52) U.S. Cl.
CPC ......... *H04N 19/51* (2014.11); *G06F 16/7837* (2019.01); *H04N 19/119* (2014.11); *H04N 19/176* (2014.11); *H04N 19/513* (2014.11); *H04N 19/52* (2014.11); *H04N 19/573* (2014.11); *H04N 19/70* (2014.11)

(58) Field of Classification Search
CPC .... H04N 19/51; H04N 19/573; H04N 19/513; H04N 19/70; H04N 19/52; H04N 19/119; H04N 19/176; G06F 16/7837
See application file for complete search history.

(56) References Cited

U.S. PATENT DOCUMENTS

2014/0016701 A1   1/2014  Chen et al.
2016/0366435 A1*  12/2016  Chien ............... H04N 19/52

FOREIGN PATENT DOCUMENTS

CN   105580364 A   5/2016

OTHER PUBLICATIONS

Office Action dated Jul. 3, 2019 in Taiwanese Application No. 10820632420 citing documents AA and AO therein.

* cited by examiner

*Primary Examiner* — Nam D Pham
(74) *Attorney, Agent, or Firm* — Oblon, McClelland, Maier & Neustadt, L.L.P.

(57) ABSTRACT

Aspects of the disclosure provide a video coding method for processing a current prediction unit (PU) with a sub-PU temporal motion vector prediction (TMVP) mode. The method can include receiving the current PU including sub-PUs, determining an initial motion vector that is a motion vector of a spatial neighboring block of the current PU, performing a searching process to search for a main collocated picture in a sequence of reference pictures of the current PU based on the initial motion vector, and obtaining collocated motion information in the main collocated picture for the sub-PUs of the current PU. The searching process can include turning on motion vector scaling operation for searching a subset of the sequence of reference pictures, and turning off the motion vector scaling operation for searching the other reference pictures in the sequence of reference pictures.

16 Claims, 8 Drawing Sheets

(51) Int. Cl.
*H04N 19/70* (2014.01)
*H04N 19/573* (2014.01)
*H04N 19/119* (2014.01)
*H04N 19/513* (2014.01)
*H04N 19/52* (2014.01)
*H04N 19/176* (2014.01)

US 10,582,209 B2

SUB-PREDICTION UNIT TEMPORAL MOTION VECTOR PREDICTION (SUB-PU TMVP) FOR VIDEO CODING

INCORPORATION BY REFERENCE

This present disclosure claims the benefit of U.S. Provisional Application No. 62/478,675, "A New Method for Motion Vector Calculation in Sub-block Merge Candidate in Video Coding" filed on Mar. 30, 2017, which is incorporated herein by reference in its entirety.

TECHNICAL FIELD

The present disclosure relates to video coding techniques.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

In image and video coding, pictures and their corresponding sample arrays can be partitioned into blocks using tree structure based schemes. Each block can be processed with one of multiple processing modes. Merge mode is one of such processing modes in which spatially or temporally neighboring blocks can share a same set of motion parameters. As a result, motion parameter transmission overhead can be reduced.

SUMMARY

Aspects of the disclosure provide a video coding method for processing a current prediction unit (PU) with a sub-PU temporal motion vector prediction (TMVP) mode. The method can include receiving the current PU including sub-PUs, determining an initial motion vector that is a motion vector of a spatial neighboring block of the current PU, performing a searching process to search for a main collocated picture in a sequence of reference pictures of the current PU based on the initial motion vector, and obtaining collocated motion information in the main collocated picture for the sub-PUs of the current PU. The searching process can include turning on motion vector scaling operation for searching a subset of the sequence of reference pictures, and turning off the motion vector scaling operation for searching the other reference pictures in the sequence of reference pictures.

In an embodiment, the subset of the sequence of reference pictures includes a first N number of the sequence of reference pictures, or includes a first N0 number of reference pictures in a first reference picture list of the current PU, and a first N1 number of reference pictures in a second reference picture list of the current PU. The first and second reference picture lists are arranged in a reference index increasing order. In addition, N, N0, and N1 are integer values greater than or equal to zero.

In an embodiment, turning on the motion vector scaling operation includes performing a motion vector scaling to scale the initial motion vector to obtain a scaled motion vector for investigating one of the subset of the sequence of reference pictures. In one example, the motion vector scaling is based on a first temporal distance between a current picture including the current PU and the being-investigated one of the subset of the sequence of reference pictures, and a second temporal distance between the current picture including the current PU and a reference picture associated with the initial motion vector.

In an embodiment, turning on the motion vector scaling operation can include, when one of the subset of the sequence of reference pictures is not a reference picture associated with the initial motion vector, perform a motion vector scaling to scale the initial motion vector to obtain a scaled motion vector for investigating the one of the subset of the sequence of reference pictures. In an embodiment, tuning off the motion vector scaling operation includes using the initial motion vector for investigating the other reference pictures in the sequence of reference pictures.

Embodiments of the method can further include determining a searching order for the searching process, and performing the searching process according to the determined searching order. Embodiments of the method can further include signaling a searching order for searching for the main collocated picture in the sequence of reference pictures of the current PU from a video encoder to a video decoder.

In an embodiment, the method further includes performing the searching process according to a searching order in which a reference picture associated with the initial motion vector is first searched, and reference pictures in two reference picture lists of the current PU are subsequently searched in an interleaved manner and in a reference index increasing order. In an embodiment, the method further includes signaling the main collocated picture from a video encoder to a video decoder.

Aspects of the disclosure provide a video coding apparatus for processing a current PU with a sub-PU TMVP mode. The apparatus can include circuitry configured to receive the current PU including sub-PUs, determine an initial motion vector that is a motion vector of a spatial neighboring block of the current PU, perform a searching process to search for a main collocated picture in a sequence of reference pictures of the current PU based on the initial motion vector, and obtain collocated motion information in the main collocated picture for the sub-PUs of the current PU. The searching process can include turning on motion vector scaling operation for searching a subset of the sequence of reference pictures, N being a predefined threshold value, and turning off the motion vector scaling operation for searching the other reference pictures in the sequence of reference pictures.

Aspects of the disclosure provide a non-transitory computer-readable medium. The medium stores instructions that implement the method for processing a current PU with a sub-PU TMVP mode.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION OF EMBODIMENTS

Figure 1:
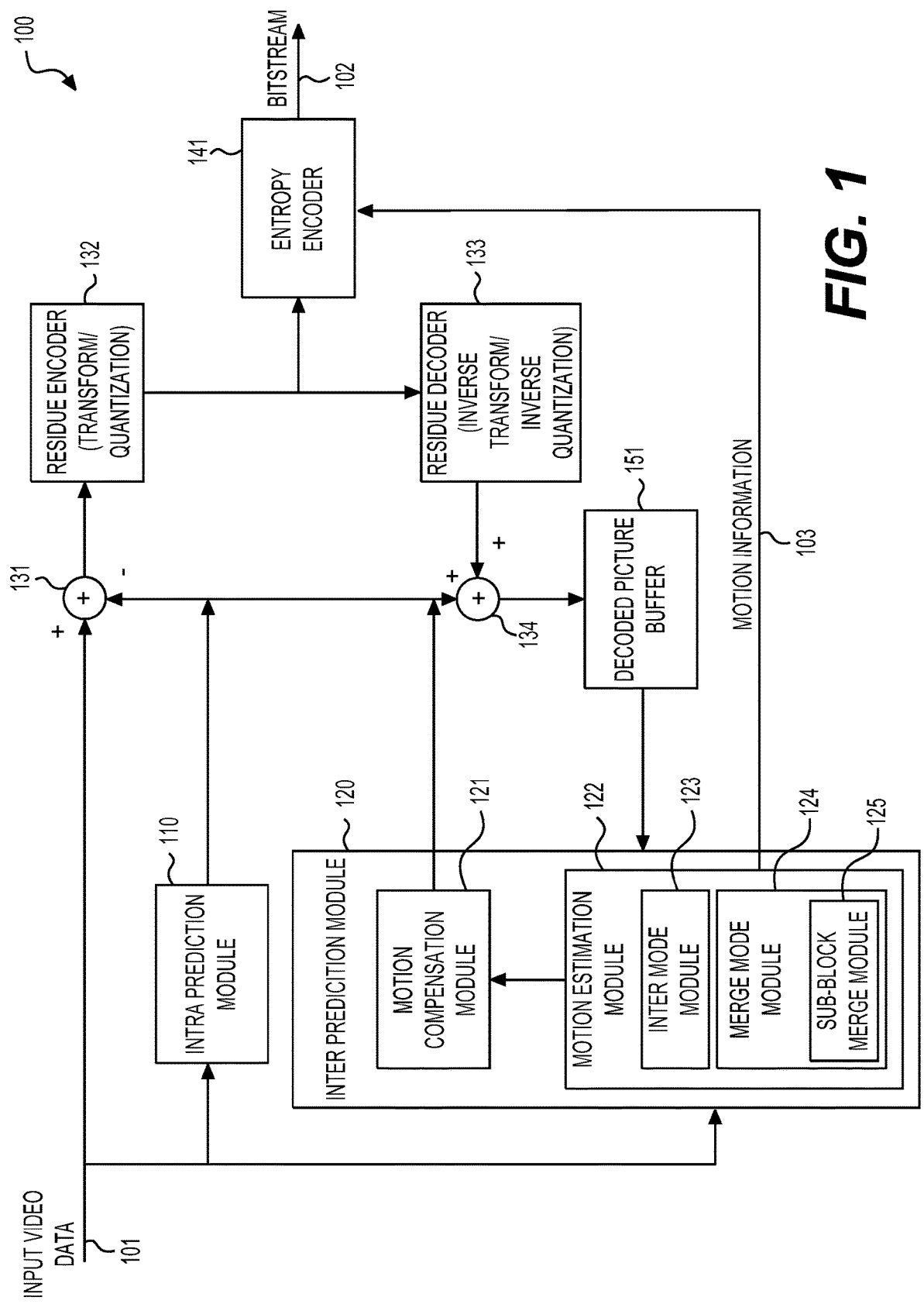
FIG. 1 shows an example video encoder according to an embodiment of the disclosure.

FIG. 1 shows an example video encoder 100 according to an embodiment of the disclosure. The encoder 100 can include an intra prediction module 110, an inter prediction module 120, a first adder 131, a residue encoder 132, an entropy encoder 141, a residue decoder 133, a second adder 134, and a decoded picture buffer 151. The inter prediction module 120 can further include a motion compensation module 121, and a motion estimation module 122. Those components can be coupled together as shown in FIG. 1.

The encoder 100 receives input video data 101 and performs a video compression process to generate a bitstream 102 as an output. The input video data 101 can include a sequence of pictures. Each picture can include one or more color components, such as a luma component or a chroma component. The bitstream 102 can have a format compliant with a video coding standard, such as the Advanced Video Coding (AVC) standards, High Efficiency Video Coding (HEVC) standards, and the like.

The encoder 100 can partition a picture in the input video data 101 into blocks, for example, using tree structure based partition schemes. In one example, the encoder 100 can partition a picture into coding units (CU) in a recursive way. For example, a picture can be partitioned into coding tree unit (CTU). Each CTU can be recursively split into four smaller CUs until a predetermined size is reached. CUs resulting from this recursive partition process can be square blocks but with different sizes.

The resulting blocks can then be processed with different processing modes, such as intra prediction modes, or inter prediction modes. In some examples, a resulting CU can be treated as a prediction unit (PU) and processed with a prediction mode. In some examples, a resulting CU can be further partitioned into multiple prediction units (PUs). A PU may include a block of luma samples and/or one or two blocks of chroma samples in some examples. Thus, PU and prediction block (PB) are used interchangeably in this specification for referring to a block of luma or chroma samples to be processed with a prediction coding mode. Generally, partition of a picture can be adaptive to local content of the picture. Accordingly, the resulting blocks (CUs or PUs) can have variable sizes or shapes at different locations of the picture.

In FIG. 1, the intra prediction module 110 can be configured to perform intra picture prediction to determine a prediction for a currently being processed block (referred to as a current block) during the video compression process. The intra picture prediction can be based on neighboring pixels of the current block within a same picture as the current block. For example, 35 intra prediction modes are specified in an HEVC standard.

The inter prediction module 120 can be configured to perform inter picture prediction to determine a prediction for a current block during the video compression process. For example, the motion compensation module 121 can receive motion information (motion data) of the current block from the motion estimation module 122. In one example, the motion information can include horizontal and vertical motion vector displacement values, one or two reference picture indices, and/or identification of which reference picture list is associated with each index. Based on the motion information and one or more reference pictures stored in the decoded picture buffer 151, the motion compensation module 121 can determine a prediction for the current block. For example, as specified in HEVC standards, two reference picture lists, List 0 and List 1, can be constructed for coding a B-type slice, and each list can include identifications (IDs) of a sequence of reference pictures. Each member of a list can be associated with a reference index. Thus, a reference index and a corresponding reference picture list together can be used in motion information to identify a reference picture in this reference picture list.

The motion estimation module 122 can be configured to determine the motion information for the current block and provide the motion information to the motion compensation module 122. For example, the motion estimation module 122 can process the current block with one of multiple inter prediction modes using the inter mode module 123 or the merge mode module 124. For example, the inter prediction modes can include an advanced motion vector prediction (AMVP) mode, a merge mode, a skip mode, a sub-PU temporal motion vector prediction (TMVP) mode, and the like.

When the current block is processed by the inter mode module 123, the inter mode module 123 can be configured to perform a motion estimation process searching for a reference block similar to the current block in one or more reference pictures. Such a reference block can be used as the prediction of the current block. In one example, one or more motion vectors and corresponding reference pictures can be determined as a result of the motion estimation process depending on unidirectional or bidirectional prediction method being used. For example, the resulting reference pictures can be indicated by reference picture indices, and, in case of bidirectional prediction is used, corresponding reference picture list identifications. As a result of the motion estimation process, a motion vector and an associated reference index can be determined for unidirectional prediction, or two motion vectors and two respective associated reference indices can be determined for bidirectional prediction. In addition, for bidirectional prediction, a reference picture list (either List 0 or List 1) corresponding to each of the associated reference indices can also be identified. Those motion information (including the determined one or two motion vectors, associated reference indices, and respective reference picture lists) are provided to the motion compensation module 121. In addition, those motion information can be included in motion information 103 that is transmitted to the entropy encoder 141.

In one example, the AMVP mode is used to predictively encode a motion vector at the inter mode module 123. For example, a motion vector predictor (MVP) candidate list can be constructed. The MVP candidate list can include a sequence of MVPs obtained from a group of spatial or temporal neighboring prediction blocks (PBs) of the current block. For example, motion vectors of spatial or temporal neighboring PBs at certain locations are selected and scaled to obtain the sequence of MVPs. A best MVP candidate can be selected from the MVP candidate list (which can be referred to as motion vector prediction competition) for predictively encoding a motion vector previously determined. As a result, a motion vector difference (MVD) can be obtained. For example, a MVP candidate having a best motion vector coding efficiency can be selected. Thus, when the AMVP mode is applied to the current block, a MVP index of the selected MVP candidate (referred to as MVP index) in the MVP candidate list and the respective MVD can be included in the motion information 103 and provided to the entropy encoder 141 in place of the respective motion vector.

When the current block is processed by the merge mode module 124, the merge mode module 124 can be configured to perform operations of a merge mode to determine the set of motion data of the current block that is provided to the motion compensation module 121. For example, a subset of candidate blocks can be selected from a set of spatial and temporal neighboring blocks of the current block located at predetermined candidate positions. For example, the temporal neighboring blocks can be located at a predetermined reference picture, such as a first reference picture at a reference picture list, List 0 or List 1, of the current block (or current picture containing the current block). Then, a merge candidate list can be constructed based on the selected subset of temporal or spatial candidate blocks. The merge candidate list can include multiple entries. Each entry can include motion information of a candidate block. For a temporal candidate block, the respective motion information (motion vectors) can be scaled before listed into the merge candidate list. In addition, motion information in the merge candidate list corresponding to a temporal candidate block can have a reference index that is set to 0 (meaning a first picture in List 0 or list 1 is used as the reference picture).

Subsequently, a best merge candidate in the merge candidate list can be selected and determined to be the motion information of the current block (prediction competition). For example, each entry can be evaluated assuming the respective entry is used as motion information of the current block. A merge candidate having highest rate-distortion performance can be determined to be shared by the current block. Then, the to-be-shared motion information can be provided to the motion compensation module 121. In addition, an index of the selected entry that includes the to-be-shared motion data in the merge candidate list can be used for indicating and signaling the selection. Such an index is referred to as a merge index. The merge index can be included in the motion information 103 and transmitted to the entropy encoder 141.

In alternative examples, a skip mode can be employed by the inter prediction module 120. For example, in skip mode, a current block can be predicted similarly using a merge mode as described above to determine a set of motion data, however, no residue is generated or transmitted. A skip flag can be associated with the current block. The skip flag can be signaled to a video decoder. At the video decoder side, a prediction (a reference block) determined based on the merge index can be used as a decoded block without adding residue signals.

In further examples, the sub-PU TMVP mode can be used as a part of the merge mode to process the current block (thus, sub-PU TMVP mode can also be referred to as sub-PU TMVP merge mode). For example, the merge mode module 124 can include a sub-block merge module 125 that is configured to perform operations of the sub-PU TMVP mode. In operations of the sub-PU TMVP mode, for example, the current block can be further partitioned into a set of sub-blocks. Temporal collocated motion vectors of each sub-block can then be obtained, scaled, and used as motion vectors of the sub-blocks. Those resulting motion vectors can be counted as a merge candidate (referred to as a sub-PU TMVP merge candidate, or sub-PU candidate) and listed in the merge candidate list. In addition, in some examples, a reference picture index associated with the resulting motion vectors are set to 0 corresponding to a reference picture list, List 0 or List 1. During the merge candidate evaluation process as described above, if the sub-PU candidate is selected (prediction competition), a merge index corresponding to the sub-PU merge candidate can be generated and transmitted in the motion information 103. The sub-PU candidate can also be provided to the motion compensation module 121 that generates a prediction of the current block based on the sub-PU candidate.

Multiple processing modes are described above, such as intra prediction mode, AMVP mode, merge mode, sub-PU TMVP mode, and skip mode. Generally, different blocks can be processed with different processing modes, and a mode decision needs to be made regarding which processing modes are to be used for one block. For example, the mode decision can be based on test results of applying different processing modes on one block. The test results can be evaluated based on rate-distortion performance of respective processing modes. A processing mode having a best result can be determined as the choice for processing the block. In alternative examples, other methods or algorithms can be employed to determine a processing mode. For example, characteristics of a picture and blocks partitioned from the picture may be considered for determination of a processing mode.

The first adder 131 receives a prediction of a current block from either the intra prediction module 110 or the motion compensation module 121, and the current block from the input video data 101. The first adder 131 can then subtract the prediction from pixel values of the current block to obtain a residue of the current block. The residue of the current block is transmitted to the residue encoder 132.

The residue encoder 132 receives residues of blocks, and compresses the residues to generate compressed residues. For example, the residue encoder 132 may first apply a transform, such as a discrete cosine transform (DCT), discrete sine transform (DST), wavelet transform, and the like, to received residues corresponding to a transform block and generate transform coefficients of the transform block. Partition of a picture into transform blocks can be the same as or different from partition of the picture into prediction blocks for inter or intra prediction processing. Subsequently, the residue encoder 132 can quantize the coefficients to compress the residues. The compressed residues (quantized transform coefficients) are transmitted to the residue decoder 133 and the entropy encoder 141.

The residue decoder 133 receives the compressed residues and performs an inverse process of the quantization and transformation operations performed at the residue encoder 132 to reconstruct residues of a transform block. Due to the quantization operation, the reconstructed residues are similar to the original residues generated from the adder 131 but typically are not the same as the original version.

The second adder 134 receives predictions of blocks from the intra prediction module 110 and the motion compensation module 121, and reconstructed residues of transform blocks from the residue decoder 133. The second adder 134 subsequently combines the reconstructed residues with the received predictions corresponding to a same region in the current picture to generate reconstructed video data. The reconstructed video data can be stored into the decoded picture buffer 151 forming reference pictures that can be used for the inter prediction operations.

The entropy encoder 141 can receive the compressed residues from the residue encoder 132, and the motion information 103 from the motion estimation module 122. The entropy encoder 141 can also receive other parameters and/or control information, such as intra prediction or inter prediction mode information, quantization parameters, and the like. The entropy encoder 141 encodes the received parameters or information to form the bitstream 102. The bitstream 102 including data in a compressed format can be transmitted to a decoder via a communication network, or transmitted to a storage device (e.g., a non-transitory computer-readable medium) where video data carried by the bitstream 102 can be stored.

Figure 2:
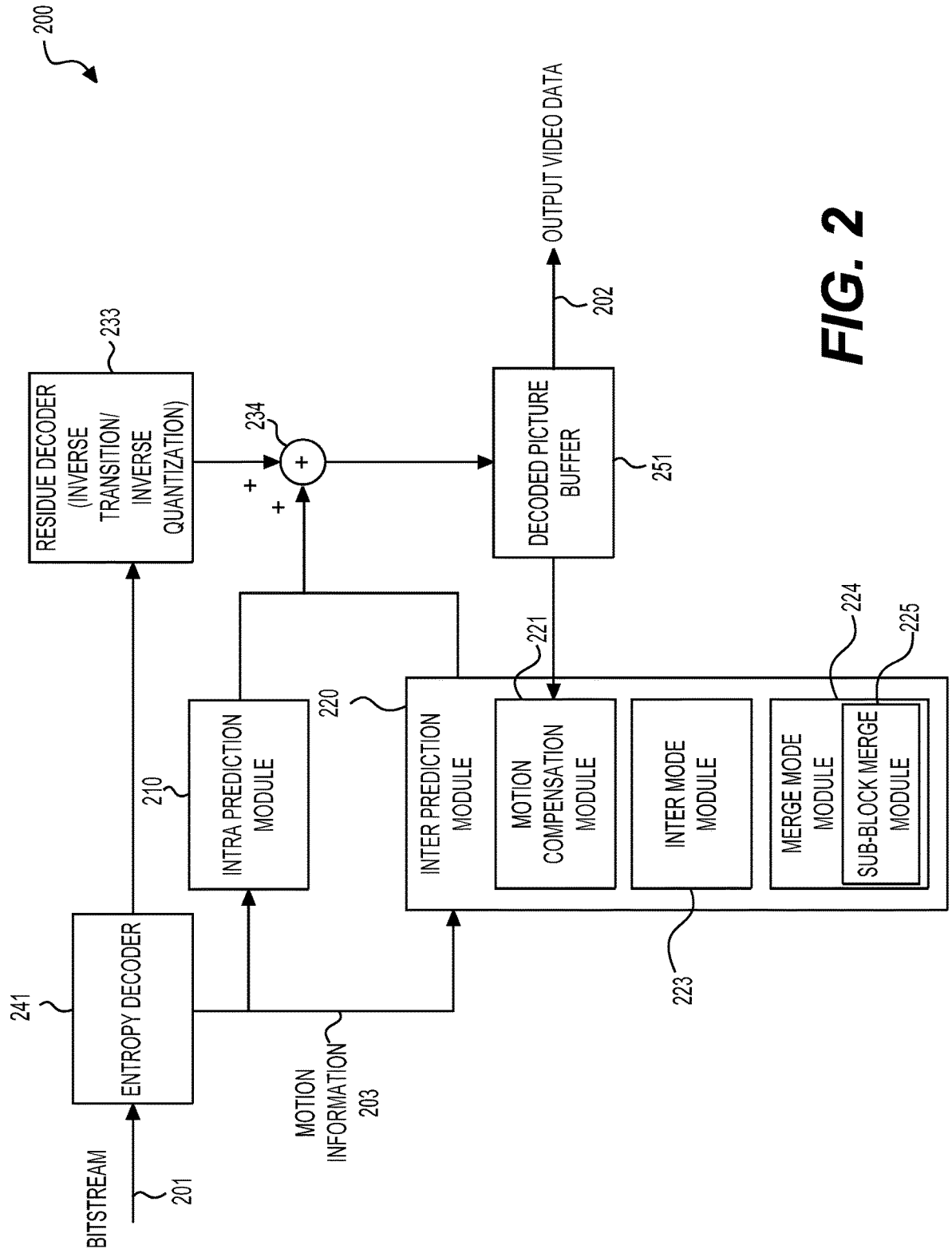
FIG. 2 shows an example video decoder according to an embodiment of the disclosure.

FIG. 2 shows an example video decoder 200 according to an embodiment of the disclosure. The decoder 200 can include an entropy decoder 241, an intra prediction module 210, an inter prediction module 220 that includes a motion compensation module 221, an inter mode module 223, and a merge mode module 224, a residue decoder 233, an adder 234, and a decoded picture buffer 251. Those components are coupled together as shown in FIG. 2. In one example, the decoder 200 receives a bitstream 201, such as the bitstream 102 from the encoder 100, and performs a decompression process to generate output video data 202. The output video data 202 can include a sequence of pictures that can be displayed, for example, on a display device, such as a monitor, a touch screen, and the like.

The entropy decoder 241 receives the bitstream 201 and performs a decoding process which is an inverse process of the encoding process performed by the entropy encoder 141 in FIG. 1 example. As a result, motion information 203, intra prediction mode information, compressed residues, quantization parameters, control information, and the like, are obtained. The compressed residues and the quantization parameters can be provided to the residue decoder 233.

The intra prediction module 210 can receive the intra prediction mode information and accordingly generate predictions for blocks encoded with intra prediction mode. The inter prediction module 220 can receive the motion information 203 from the entropy decoder 241, and accordingly generate predictions for blocks encoded with the AMVP mode, merge mode, sub-PU TMVP mode, skip mode, or the like. The generated predictions are provided to the adder 234.

For example, for a current block encoded with the AMVP mode, the inter mode module 223 can receive a MVP index and a MVD corresponding to the current block. The intra mode module 223 can construct a MVP candidate list in a same manner as the intra mode module 123 at the video encoder 100 in FIG. 1 example. Using the MVP index and based on the constructed MVP candidate list, a MVP candidate can be determined. A motion vector can subsequently be derived by combining the MVP candidate with the MVD, and provided to the motion compensation module 221. In combination with other motion information, such as reference indexes, respective reference picture lists, and based on reference pictures stored in the decoded picture buffer 251, the motion compensation module 221 can generate a prediction of the current block.

For a block encoded with the merge mode, the merge mode module 224 can obtain a merge index from the motion information 103. In addition, the merge mode module 224 can construct a merge candidate list in a same manner as the merge mode module 124 at the video encoder 100 in FIG. 1 example. Using the merge index and based on the constructed merge candidate list, a merge candidate can be determined and provided to the motion compensation module 221. The motion compensation module 221 can accordingly generate a prediction of the current block.

In one example, the received merge index can indicate sub-PU TMVP mode is applied to the current block. For example, the merge index is within a predefined range for representing sub-PU candidates, or the merge index is associated with a special flag. Accordingly, sub-PU TMVP mode related operations can be performed at a sub-block merge module 225 to derive a respective sub-PU merge candidate corresponding to the merge index. For example, the sub-block merge module 225 can obtain the sub-PU merge candidate in a same manner as the sub-block merge module 125 at the video encoder 100 in FIG. 1 example. The derived sub-PU merge candidate can then be provided to the motion compensation module 221. The motion compensation module 221 can accordingly generate a prediction of the current block.

The residue decoder 233, and the adder 234 can be similar to the residue decoder 133 and the second adder 134 in the FIG. 1 example in terms of functions and structures. Particularly, for blocks encoded with skip mode, no resides are generated for those blocks. The decoded picture buffer 251 stores reference pictures useful for motion compensation performed at the motion compensation module 221. The reference pictures, for example, can be formed by reconstructed video data received from the adder 234. In addition, reference pictures can be obtained from the decoded picture buffer 251 and included in the output video data 202 for displaying to a display device.

In various embodiments, the components of the encoder 100 and decoder 200 can be implemented with hardware, software, or combination thereof. For example, the merge modules 124 and 224 can be implemented with one or more integrated circuits (ICs), such as an application specific integrated circuit (ASIC), field programmable gate array (FPGA), and the like. For another example, the merge modules 124 and 224 can be implemented as software or firmware including instructions stored in a computer readable non-volatile storage medium. The instructions, when executed by a processing circuit, causing the processing circuit to perform functions of the merge modules 124 or 224.

It is noted that the merge modules 124 and 224 can be included in other decoders or encoders that may have similar or different structures from what is shown in FIG. 1 or FIG. 2. In addition, the encoder 100 and decoder 200 can be included in a same device, or separate devices in various examples.

Figure 3:
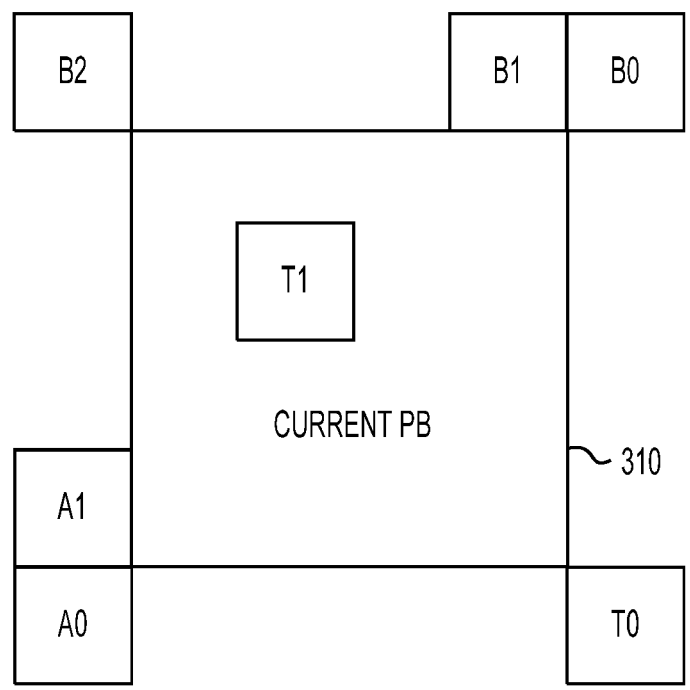
FIG. 3 shows an example of spatial and temporal candidate positions for deriving motion vector predictor (MVP) candidates in an advanced motion vector prediction (AMVP) mode or for deriving merge candidates in a merge mode according to some embodiments of the disclosure.

FIG. 3 shows an example of spatial and temporal candidate positions for deriving MVP candidates in an AMVP mode or for deriving merge candidates in a merge mode according to some embodiments of the disclosure. The candidate positions in FIG. 3 are similar to that specified in HEVC standards for merge mode or AMVP mode. As shown, a PB 310 is to be processed with the AMVP mode or the merge mode. A set of candidate positions {A0, A1, B0, B1, B2, T0, T1} are predefined. Specifically, candidate positions {A0, A1, B0, B1, B2} are spatial candidate positions that represent positions of spatial neighboring blocks of the PB 310 that are in the same picture as the PB 310. In contrast, candidate positions {T0, T1} are temporal candidate positions that represent positions of temporal neighboring blocks that are in a reference picture. In some examples, the reference picture can be a first reference picture (reference index equals zero) of a reference list, List 0 or List 1, for example, specified in a slice header. The candidate position T1 is around the central of the PB 310.

In FIG. 3, each candidate position is represented by a block of samples, for example, having a size of 4×4 samples. A size of such a block can be equal to or smaller than a minimum allowed size of PBs (e.g., 4×4 samples) defined for a tree-based partitioning scheme used for generating the PB 310. Under such configuration, a block representing a candidate position can always be covered within a single neighboring PB. In alternative example, a sample position may be used to represent a candidate position.

During a MVP candidate list or merge candidate list construction process, motion information of neighboring PBs at the candidate positions can be selected to be MVP or merge candidates and included in the MVP or merge candidate list. In some scenarios, a MVP or merge candidate at a candidate position may be unavailable. For example, a candidate block at a candidate position can be intra-predicted, or can be outside of a slice including the current PB 310 or is not in a same CTB row as the current PB 310. In some scenarios, a merge candidate at a candidate position may be redundant. For example, a same neighboring block of the PB 310 can overlap with two candidate positions. The redundant merge candidate can be removed from the candidate list in some examples.

In one example, in the AMVP mode, a left MVP can be a first available candidate from positions {A0, A1}, a top MVP can be a first available candidate from positions {B0, B1, B2}, and a temporal MVP can be a first available candidate from positions {T0, T1} (T0 is used first. If T0 is not available, T1 is used instead). If the left MVP is not available and the top MVP is not a scaled MVP, a second top MVP can be derived from positions {B0, B1, B2} if there is a scaled MVP among candidates at {B0, B1, B2}. As an example, a MVP candidate list size is set to 2 in HEVC standards. Therefore, after the derivation process of the two spatial MVPs and one temporal MVP, the first two MVPs can be included in the MVP candidate list. If after removing redundancy, the number of available MVPs is less than two, zero vector candidates can be added to the MVP candidates list.

In one example, for a merge mode, up to four spatial merge candidates are derived from positions {A0, A1, B0, B1}, and one temporal merge candidate is derived from positions {T0, T1} (T0 is used first. If T0 is not available, T1 is used instead). If any of the four spatial merge candidates is not available, the position B2 is then used to derive a merge candidate as a replacement. After the derivation process of the four spatial merge candidate and one temporal merge candidate, removing redundancy can be applied to remove redundant merge candidate. If after removing redundancy, the number of available merge candidate is smaller than a predefined merge candidate list size (such as 5 in an example), additional candidates can be derived and added to the merge candidates list. In some examples, the additional candidates can include the following three candidate types: combined bi-predictive merge candidate, scaled bi-predictive merge candidate, and zero vector merge candidate.

Figure 4:
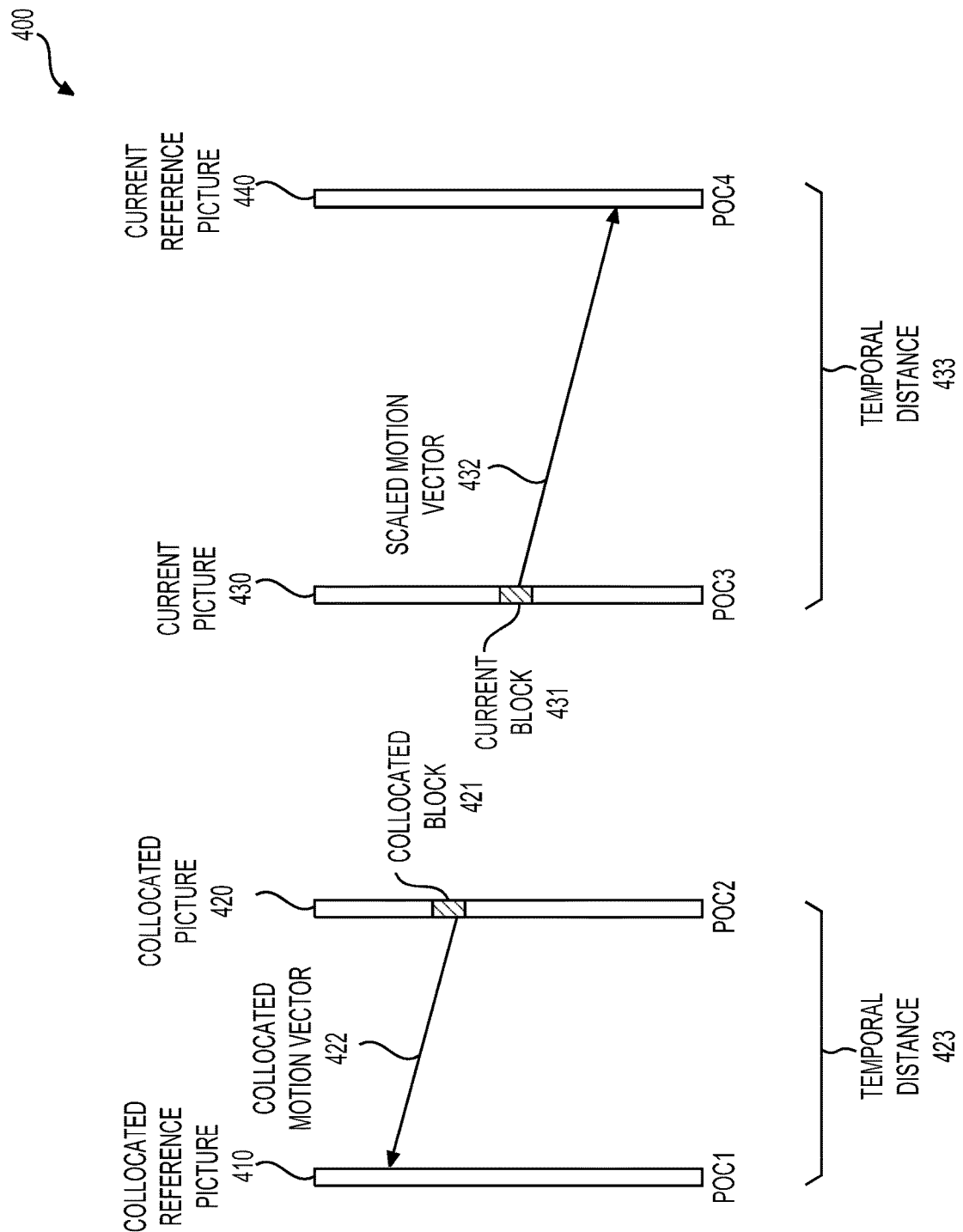
FIG. 4 shows an example of a motion vector scaling operation according to some embodiments of the disclosure.

FIG. 4 shows an example of a motion vector scaling operation 400 according to some embodiments of the disclosure. By performing the motion vector scaling operation 400, a scaled motion vector 432 can be derived from a collocated motion vector 422. Specifically, the scaled motion vector 432 is associated with a current picture 430 and a current reference picture 440. The scaled motion vector 432 can be used to determine a prediction for a current block 431 in the current picture 430. In contrast, the collocated motion vector 422 is associated with a collocated picture 420 and a collocated reference picture 410. The collocated motion vector 422 can be used to determine a prediction for a collocated block 421 in the collocated picture 420. Additionally, the pictures 410-440 can each be assigned a picture order count (POC) value, POC 1-POC 4 indicating an output position (or a presentation time) relative to other pictures in a video sequence.

Particularly, the collocated block 421 can be a temporal neighboring block of the current block 431. For example, the collocated block 421 can be a temporal neighboring block at the candidate positions T0 or T1 in FIG. 3 for the AMVP mode or merge mode. In addition, corresponding to the AMVP mode, the current reference picture 440 can be a reference picture of the current block 431 determined by a motion estimation operation. Corresponding to the merge mode, the current reference picture 440 can be a reference picture preconfigured for temporal merge candidates, for example, a first reference picture (reference index equals zero) in a reference picture list, List 0 or List 1, of the current block 431.

For motion vector scaling operations, it can be assumed that a value of a motion vector is proportional to a temporal distance in presentation time between two pictures associated with the motion vector. Based on the assumption, the scaled motion vector 432 can be obtained by scaling the collocated motion vector 422 based on two temporal distances. For example, as shown in FIG. 4, a first temporal distance 433 can be a difference of POC 3−POC4, and a second temporal distance 423 can be a difference of POC 2−POC 1. Accordingly, a vertical or horizontal displacement value of the scaled motion vector MVS_x, or MVS_y can be calculated using the following expressions:

$$\text{MVS\_x} = \frac{POC3 - POC4}{POC2 - POC1} \text{MVC\_x},$$

$$\text{MVS\_y} = \frac{POC3 - POC4}{POC2 - POC1} \text{MVC\_y},$$

where MVC_x and MVC_y are vertical and horizontal displacement values of the collocated motion vector 422. In alternative examples, motion scaling operation may be performed in a way different from what is described above. For example, expressions different from the above expressions may be used and additional factors may be considered.

Figure 5:
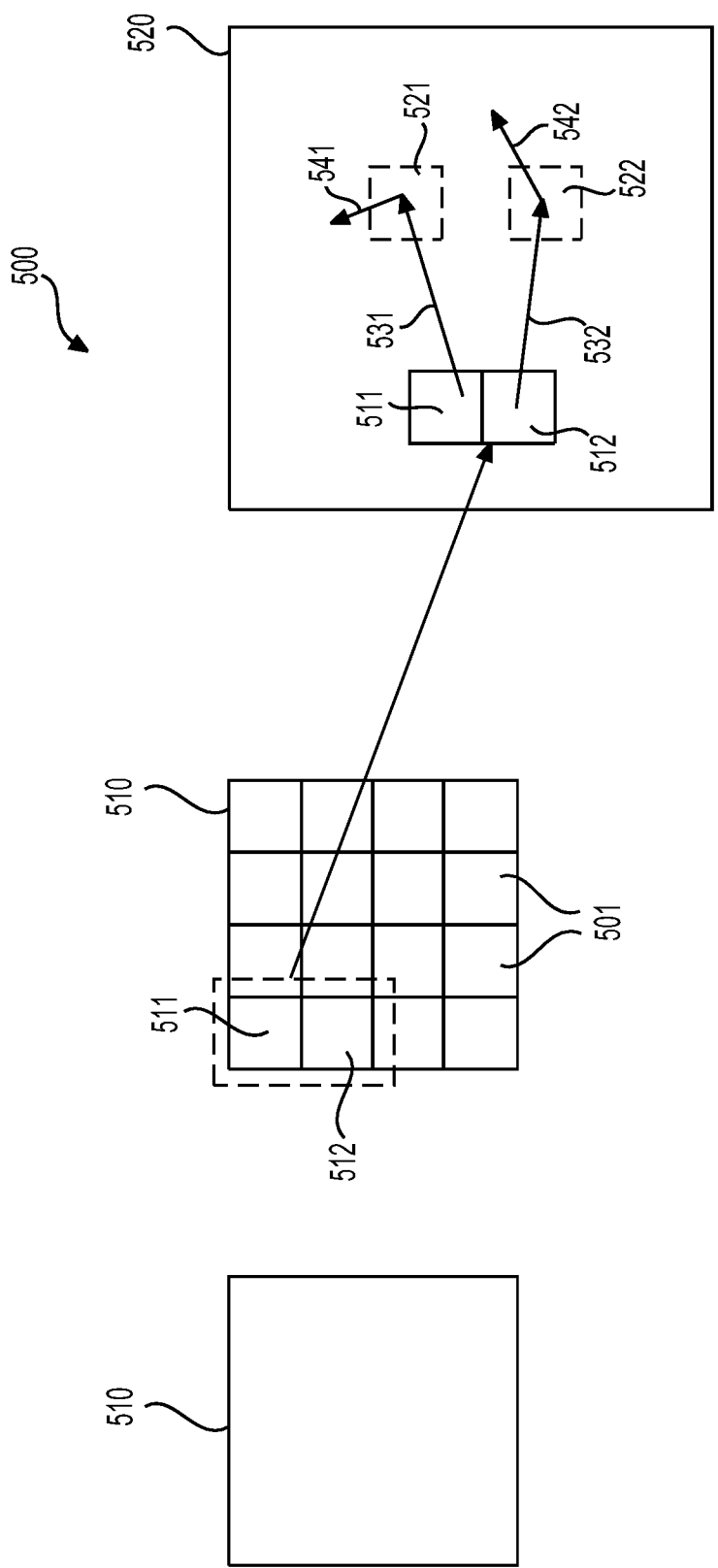
FIG. 5 shows an example process for processing a current PU with sub-PU TMVP mode according to some embodiments of the disclosure.

FIG. 5 shows an example process 500 for processing a current PU 510 with sub-PU TMVP mode according to some embodiments of the disclosure. The process 500 can be performed to determine a set of merge candidates (motion information) for sub-blocks of the current PU 500. The process 500 can be performed at the sub-block merge module 125 in the video encoder 100 in FIG. 1 example, or at the sub-block merge module 225 in the video decoder 200 in FIG. 2 example.

Specifically, the current PU 510 can be partitioned into sub-PUs 501. For example, the current PU 510 can have a size of M×N pixels, and be partitioned into (M/P)×(N/Q) sub-PUs 501 where M is divisible by P, and N is divisible by Q. Each resulting sub-PU 501 is of a size of P×Q pixels. For example, a resulting sub PU 501 can have a size of 8×8, 4×4, or 2×2 pixels.

Then, a reference picture 520, referred to as temporal collocated picture 520, can be determined. Next, a motion vector for each sub-PU 501, referred to as an initial sub-PU motion vector, can be determined. As shown, the sub-PU 511 has an initial sub-PU motion vector 531. The sub-PU 512 has an initial sub-PU motion vector 532. Thereafter, a set of temporal collocated sub-PUs (that are temporal neighboring blocks of the sub-PUs 501) can be determined. The set of temporal collocated sub-PUs (each corresponding to a sub-PU 501) can be located at the temporal collocated picture 520 and determined by the initial sub-PU motion vectors. As shown, a temporal collocated sub-PU 521 and a temporal collocated sub-PU 522 can be determined using the initial sub-PU motion vectors 531 and 532, respectively.

Subsequently, motion information of determined temporal collocated sub-PUs is obtained for the PU 510. For example, motion information of the temporal collocated sub-PU 521 can be used for deriving a motion vector of the sub-PU 511. For example, the motion information of the temporal collocated sub-PU 521 may include a motion vector 541, an associated reference index, and optionally a reference picture list corresponding to the associated reference index. Similarly, motion information (including a motion vector 542) of the temporal collocated sub-PU 522 can be used for deriving a motion vector of the sub-PU 512. For example, a motion vector scaling can be performed to derive a respective motion vector.

In alternative examples of the process 500 for processing the current PU 510 with sub-PU TMVP mode, operations can be different from the above descriptions. For example, in various examples, different sub-PUs 501 may use different temporal collocated pictures, and methods for determining the temporal collocated pictures can vary. In addition, methods for determining initial sub-PU motion vectors can vary. In one example, initial sub-PU motion vectors of the sub-PUs can use a same motion vector, such as a motion vector of a special neighboring block of the current PU 510.

As can be seen, the sub-PU TMVP mode enables detailed motion information of a plurality of sub-PUs to be derived and utilized for encoding a current block. In contrast, in a conventional merge mode, a current block is treated as a whole and one merge candidate is used for a whole current block. As a result, a sub-PU TMVP mode can potentially provide more accurate motion information than a traditional merge mode for sub-PUs, thus improving video coding efficiency.

Figure 6:
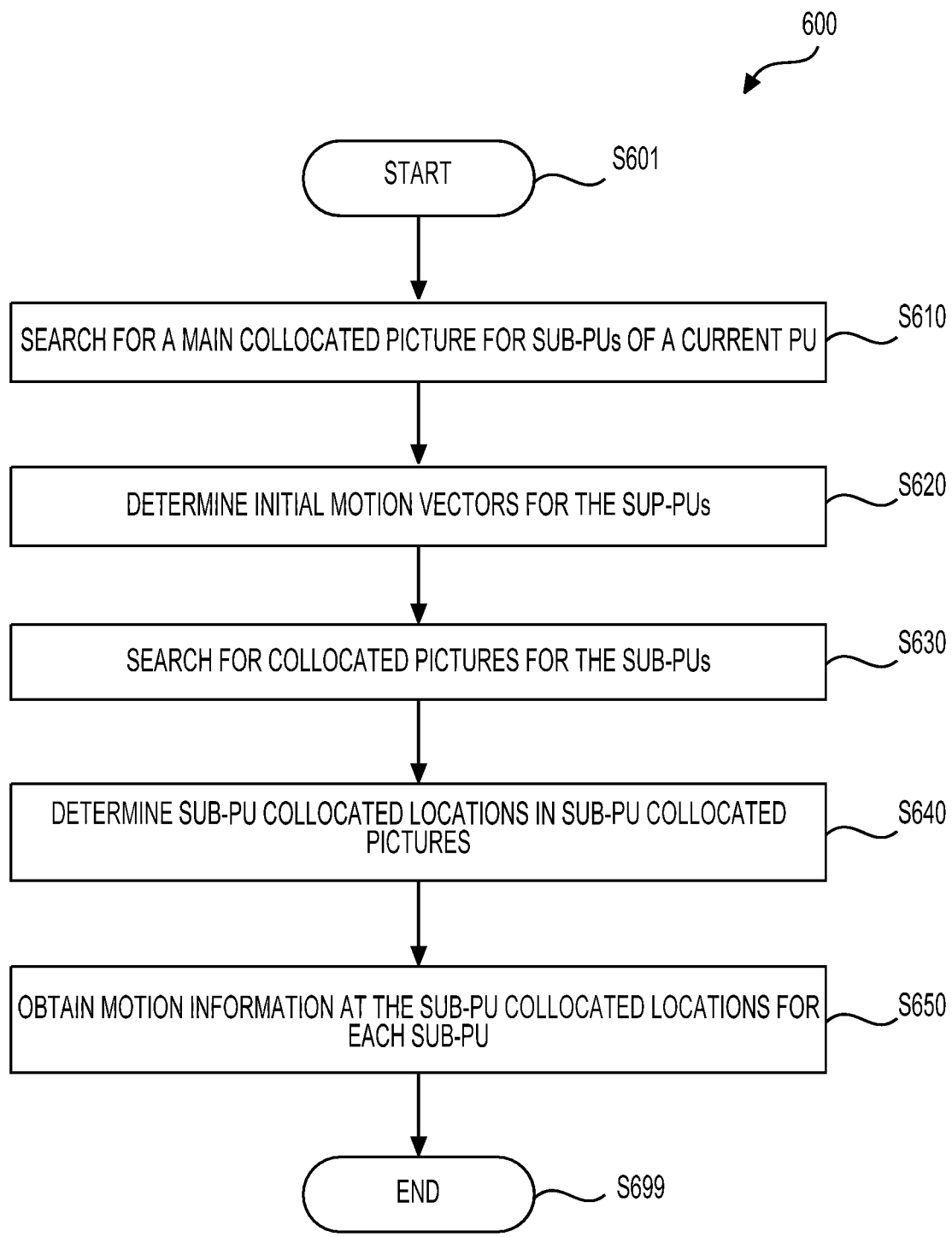
FIG. 6 shows an example process for processing a current block with a sub-PU TMVP mode according to some embodiments of the disclosure.

FIG. 6 shows an example process 600 for processing a current block (PU) with a sub-PU TMVP mode according to some embodiments of the disclosure. The process 600 can be performed at the sub-block merge module 125 in the video encoder 100 in FIG. 1 example, or at the sub-block merge module 225 in the video decoder 200 in FIG. 2 example. The process 600 starts at S601 and proceeds to S610.

At S610, a reference picture (referred to as a main collocated picture) for sub-PUs of the current PU is determined during a search process. First, the sub-block merge module 125 or 225 can find an initial motion vector for the current PU. The initial motion vector can be denoted as vec_init. In one example, the vec_init can be a motion vector from a first available spatial neighboring block such as one of the neighboring blocks at one of the positions {A0, A1, B0, B1, B2} in FIG. 3 example.

In one example, the vec_init is a motion vector associated with a reference picture list that is first searched during the search process. For example, the first available spatial neighboring block is in a B-slice that is associated with two reference picture lists. Thus, the first available special neighboring block may have two motion vectors associated with different reference picture lists, List 0 and List 1. The two motion vectors are referred to as List 0 motion vector and List 1 motion vector, respectively. During the search process, one of List 0 and List 1 can be determined to be first searched (as described below) for the main collocated picture, and the other one is searched subsequently. The one (List 0 or List 1) being searched firstly is referred to as a first list, and the one being searched secondly is referred to as a second list. Therefore, among the List 0 motion vector and the List 1 motion vector of the first available spatial neighboring block, the one associated with the first list can be used as the vec_init.

For example, List X is the first list for searching for collocated information in a main collocated picture, then the vec_init uses List 0 motion vector if List X=List 0, and uses List 1 motion vector if List X=List 1. The value of List X (List 0 or List 1) depends on which list (List 0 or List 1) is better for collocated information. If List 0 is better for collocated information (e.g., depending on how the List 0 and List 1 is constructed, POC distances of pictures in List 0 is closer than that of List 1), then List X=List 0, and vice versa. List X assignment can be at slice level or picture level. In alternative examples, the vect_init may be determined using different methods.

After the initial motion vector of the current PU is determined, a collocated picture searching process can start to search for the main collocated picture. The main collocated picture is denoted as main_colpic. The collocated picture searching process is to find a main collocated picture for sub-PUs of the current PU. During the collocated picture searching process, reference pictures of the current PU (e.g., reference pictures in reference picture list(s) of a current slice including the current PU) are searched and investigated, and one of the reference pictures is selected to be the main_colpic. In various examples, the searching processes can be carried out in different ways. For example, reference pictures can be investigated with different methods (e.g. with or without a motion vector scaling operation). Or, orders for searching the reference pictures can vary.

In one example, the searching is carried out in the following order. First, a reference picture selected by the first available spatial neighboring block (such as the reference picture associated with the initial motion vector) is searched. Then, in B-Slices, all reference pictures of the current PU can be searched, starting from one reference picture list, List 0 (or List 1), reference index 0, then index 1, then index 2, and so on (increasing index order). If the searching on List 0 (or List 1) is completed without finding a valid main collocated picture, another list, List 1 (or List 0) can be searched. In P-slice, the reference pictures of current PU in List 0 can be searched, starting from reference index 0, then index 1, then index 2, and so on (increasing index order).

During the search for the main collocated picture, reference pictures are investigated to determine if the being-investigated picture is valid or available. Thus, this investigation of each reference picture is also referred to as an availability checking. In some examples, the investigation can be performed in the following way for each searched picture (being-investigated picture) except the reference picture associated with the initial motion vector. In a first step, a motion vector scaling operation can be performed. By the motion vector scaling operation, the initial motion vector is scaled resulting in a scaled motion vector, denoted as vec_init_scaled, corresponding to the being-investigated reference picture. The scaling operation can be based on a first temporal distance between the current picture (including the current PU and the first available spatial neighboring block) and the reference picture associated with the initial motion vector, and a second temporal distance between the current picture and the being-investigated reference picture. For the first being-investigated picture (that is the reference picture associated with initial motion vector), no scaling operation is performed.

In some examples, optionally, before the motion vector scaling operation is performed, a decision of whether to perform a motion vector scaling can be determined. For example, whether a being-investigated reference picture in List 0 or List 1 and the reference picture associated with the initial motion vector are a same picture is examined. When the reference picture associated with the initial motion vector and the being-investigated reference picture are the same picture, the motion vector scaling can be skipped, and the investigation of this being-investigated picture can be finished. In opposite situation, the scaling operation can be performed as described above.

Below are two examples of examining whether a being-investigated reference picture in List 0 or List 1 and the reference picture associated with the initial motion vector are a same picture. In a first example, when a reference index associated with the initial motion vector of the first available spatial neighboring block is not equal to a reference index of a being-investigated reference picture, the scaling operation can be performed. In another example, POC values of the reference picture associated with the initial motion vector and the reference picture being-investigated can be examined. When the POC values are different, the scaling operation can be performed.

In a second step of the investigation, a checking position in the being-investigated picture is determined based on the scaled initial motion vector, and is checked to determined whether the checking position is inter coded (processed with an inter prediction mode) or intra coded (processing with an intra prediction mode). If the checking position is inter coded (availability checking is successful), the being-investigated picture can be used as the main collocated picture, and the searching process can stop. If the checking position is intra coded (availability checking is failed), the search can continue to investigate a next reference picture.

In one example, an around center position of the current PU is added with vec_init_scaled to determine the checking position in the being-investigated picture. The around center position can be determined in various ways in different examples. In one example, the around center position can be a center pixel. For example, for the current PU of size M×N pixels, the around center position can be position (M/2, N/2). In one example, the around center position can be a center sub-PU's center pixel in the current PU. In one example, the around center position can be a position around the center of the current PU other than positions in the former two examples. In alternative examples, the checking position may be defined and determined in a different way.

For the reference picture associated with the initial motion vector, an around center position of the current PU can be added with vec_init instead of vec_init_scaled to determine the checking position.

At S620, initial motion vectors for sub-PUs of the current PU can be determined. For example, the current PU of a size of M×N pixels can be partitioned into sub-PUs of a size of P×Q pixels. A sub-PU initial motion vector can be determined for each sub-PU. A sub-PU initial motion vector for the i-th sub-PU can be denoted as vec_init_sub_i (i=0~((M/P)×(N/Q)−1)). In one example, the sub-PU initial motion vectors equal the scaled initial motion vector corresponding to the main collocated picture found at S610 (vec_init_sub_i=vec_init_scaled). In one example, the sub-PU initial motion vectors, vec_init_sub_i(i=0~((M/P)×(N/Q)−1)) may be different with each other, and can be derived based one or more spatial neighboring PUs of the current block, or with other suitable methods.

At S630, collocated pictures for the sub-PUs, referred to as sub-PU collocated pictures, can be searched for. For example, for each sub-PU, a sub-PU collocated picture from reference picture List 0 and a sub-PU collocated picture from reference picture List 1 can be found. In one example, there is only one collocated picture (using the main_colpic as described above) for reference picture List 0 for all sub-PUs of the current PU. In one example, sub-PU collocated pictures for reference picture List 0 for all sub-PUs may be different. In one example, there is only one collocated picture (using main_colpic as described earlier) for reference picture List 1 for all sub-PUs of the current PU. In one example, sub-PU collocated pictures for reference picture List 1 for all sub-PUs may be different. The sub-PU collocated picture for reference picture List 0 for the i-th sub-PU can be denoted as collocated_picture_i_L0, and sub-PU collocated picture for reference picture List 1 for the ith-sub-PU can be denoted as collocated_picture_i_L1. In one example, the main_colpic is used for all sub-PUs of the current PU for both List 0 and List 1.

At S640, sub-PU collocated locations in sub-PU collocated pictures can be determined. For example, a collocated location in a sub-PU collocated picture can be found for a sub-PU. In one example, the sub-PU collocated location can be determined according to the following expressions:

collocated location $x$=sub-PU_$i\_x$+vec_init_sub_$i\_x$ (integer part)+shift_$x$, collocated location $y$=sub-PU_$i\_y$+vec_init_sub_$i\_y$ (integer part)+shift_$y$, where sub-PU_i_x represents a horizontal left-top location of the i-th sub-PU inside the current PU (integer location), sub-PU_i_y represents vertical left-top location of the i-th sub-PU inside the current PU (integer location), vec_init_sub_i_x represents a horizontal part of vec_init_sub_i (vec_init_sub_i can have an integer part and a fractional part in the calculation, and the integer part is used), vec_init_sub_i_y represents a vertical part of vec_init_sub_i (similarly, integer part is used), shift_x represents a first shift value, and shifty means a second shift value. In one example, shift_x can be a half of a sub-PU width, and shifty can be a half of a sub-PU height. In alternative examples, the shift_x or shifty may take other suitable values.

At S650, motion information at the sub-PU collocated locations can be obtained for each sub-PU. For example, motion information as a temporal predictor for the i-th sub-PU, denoted as subPU_MI_i, can be obtained for each sub-PU from respective sub-PU collocated pictures. The subPU_MI_i can be motion information from collocated_picture_i_L0 and collocated_picture_i_L1 on collocated location x and collocated location y. In one example, a subPU_MI_i can be defined as the set of {MV_x, MV_y, associated reference lists, associated reference indexes, and other merge-mode-sensitive information, such as a local illumination compensation flag}. MV_x and MV_y represent horizontal and vertical motion vector displacement values of motion vectors at collocated location x and col-located location y in collocated_picture_i_L0 and collocated_picture_i_L1 of the i-th sub-PU.

In addition, in some examples, MV_x and MV_y may be scaled according to a temporal distance relation between collocated picture, current picture, and reference picture of the collocated motion vector (MV). For example, a sub-PU in a current picture can have a first reference picture (such as a first reference picture in List 0 or List 1), and have a sub-PU collocated picture including a collocated motion vector of the sub-PU. The collocated motion vector can be associated with a second reference picture. Accordingly, the collocated motion vector can be scaled to obtain a scaled motion vector based on a first temporal distance between the current picture and the first reference picture, and a second temporal distance between the sub-PU collocated picture and the second reference picture. The process 600 can proceed to S699 and terminates at S699.

Figure 7:
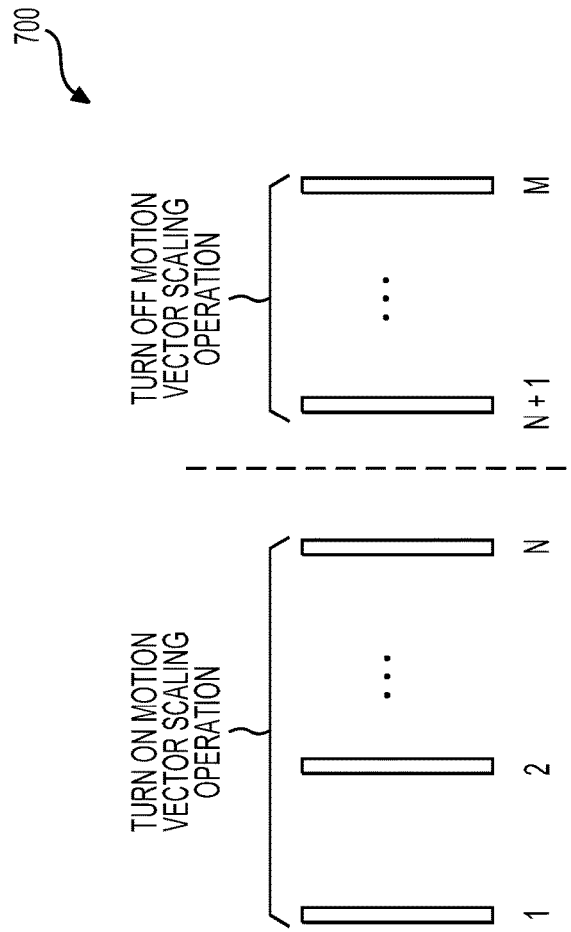
FIG. 7 shows a first example method for reducing computational cost related with motion vector scaling operations according to some embodiments of the disclosure.

FIG. 7 shows a first example method for reducing computational cost related with motion vector scaling operations according to some embodiments of the disclosure. A sequence of M number of reference pictures 700 of a current PU is shown in FIG. 7. The sequence of M number of reference pictures 700 can include the reference picture associated with the initial motion vector and pictures included in one or two reference picture lists (List 0 and List 1) of the current PU. For example, the current PU is to be processed with sub-PU TMVP mode, for example, based on the process 600 in FIG. 6. The sequence of reference pictures 700 are to be investigated during a collocated picture search process in order to find a main collocated picture as described in S610 in FIG. 6.

In a worst-case scenario, motion vector scaling operations for scaling an initial motion vector may need to be performed for all M reference pictures (except pictures the same as the reference picture associated with the initial motion vector). For example, the current PU may have 32 reference pictures in List 0, and 32 reference pictures in List 1. A accordingly, in worst case, about 64 times of motion vector scaling operations may need to be performed. In addition, there can be numerous PUs to be processed in one picture. Thus, computation cost related with motion vector scaling operations in one picture can be significant in certain scenarios.

In order to reduce the motion vector scaling cost, in some embodiments, motion vector scaling operations are limited to the first N number of to-be-searched reference pictures, for example, in at least one of the reference picture lists. N can be a predefined threshold value. For example, N can be 3, 4, 5, or the like. For example, motion vector scaling operations can be performed when searching the first N number of to-be-searched reference pictures; however, no motion vector scaling is performed when searching reference pictures beyond the first N number of to-be-searched reference pictures. Instead, the initial motion vectors can be used for investigating a being-investigated picture. In other words, motion vector scaling operation can be turned on when searching the first N number of the to-be-searched reference pictures, and tuned off when searching reference pictures beyond the first N number of the to-be-searched reference pictures, as shown in FIG. 7.

It is assumed that searching beyond the N number of to-be-searched reference pictures takes place with a small probability while searching within the N number of to-be-searched reference pictures usually has a high probability when considering a large amount of sub-PUs. Thus, skipping the motion vector scaling operation would happen with a low probability, and the resulting negative effect (loss of accuracy) would occur with a low probability but worst-case scenarios of significant computational cost can be avoided.

As an example, as shown in FIG. 7, when searching the first N number of the reference pictures, the reference picture associated with the initial motion vector can first be investigated using the initial motion vector. Then, other pictures of the first N reference pictures can be investigated. For example, whether a being-investigated picture is the reference picture associated with the initial motion vector can be determined. Then, for a being-investigated picture that is not reference picture associated with the initial motion vector, the motion vector scaling can be performed to obtain a scaled motion vector. Subsequently, the scaled motion vector can be used to investigate the being-investigated picture (e.g., determine a checking position and check whether intra coded or inter coded). When searching reference pictures beyond the first N number of the reference pictures 700, no scaling is performed, and the initial motion vector can be used for investigating a being-investigated picture.

Below is an example of implementing the method for reducing computational cost related with motion vector scaling operation. In this example, a variable i is defined as a searching order during the main collocated picture searching. For example, i=1 when searching the first picture, i=2 when searching the second picture. The motion vector scaling operation of the initial motion vector is turned on in first N pictures during searching the main collocated picture (i<=N) and turned off when the searched picture order i>=(N+1). If a certain searched picture is turned off for the initial motion vector scaling, vec_init_scaled=vec_init can be used for this picture in the sub-PU TMVP process. If a certain searched picture is turned on for motion vector scaling for the initial motion vector scaling, vec_init_scaled=scaled version of vec_init can be used for this picture in the sub-PU TMVP process.

Embodiments of flexibly defining a searching order in a collocated picture searching process (such as the collocated picture searching process described in FIG. 6 example) are now described. In one example, the collocated picture searching process can have a predefined order. For example, the searching order can be fixed as described in FIG. 6 example: first, the reference picture associated with the initial motion vector is searched; then pictures in List 0 (or List 1) are investigated in reference index increasing order; and subsequently, pictures in List 1 (or List 0) are investigated in reference index increasing order. However, results of such fixed order may not be optimal. For example, reference picture lists, List 0 and/or List 1, can be arrange differently for different pictures or slices. Thus, locations of most nearest reference pictures to the current picture in terms of temporal distances can vary. Flexibly adjust searching orders in searching for a main collocated picture can increase probabilities to find a better main collocated picture compared with using a fixed searching order.

Accordingly, in some embodiments, searching orders in a main collocated picture search process can be defined or configured to be adaptive and adjustable. For example, the sub-block merge module 125 or 225 at the video encoder 100 or video decoder 200, respectively, can flexibly select or determine a search order according to some conditions, such as reference picture arrangement of a reference picture list(s). In some examples, the search order determined at an encoder can be signaled to a decoder in picture sequence level, picture level, slice level, or PU level. In some examples, an encoder and a decoder can determine a search order according to a same rule resulting in a same searching order without any signaling operation.

For example, in order to specify a searching order, the following notation can be employed. A to-be-searched picture having a searching order i (represented as searched_i) can be assigned or specified by a syntax element {USING_INITVEC_REF_PIC, LIST, REFERENCE_INDEX}. In this syntax element, the USING_INITVEC_REF_PIC can take a value of 0 or 1. If USING_INITVEC_REF_PIC=1, the syntax element specifies a to-be-searched picture that is a reference picture selected by a first available spatial neighboring block of a current PU (the reference picture associated with the initial motion vector). If USING_INITVEC_REF_PIC=1, then the LIST and REFERENCE_INDEX in the syntax element of searched_i are ignored. If USING_INITVEC_REF_PIC=0, the LIST and REFERENCE_INDEX in the syntax element of searched_i become effective. Specifically, the LIST specifies a reference picture list, List 0 or List 1, and the REFERENCE_INDEX specifies a reference index. Accordingly, a reference picture can be specified by the LIST and REFERENCE_INDEX.

Figure 8:
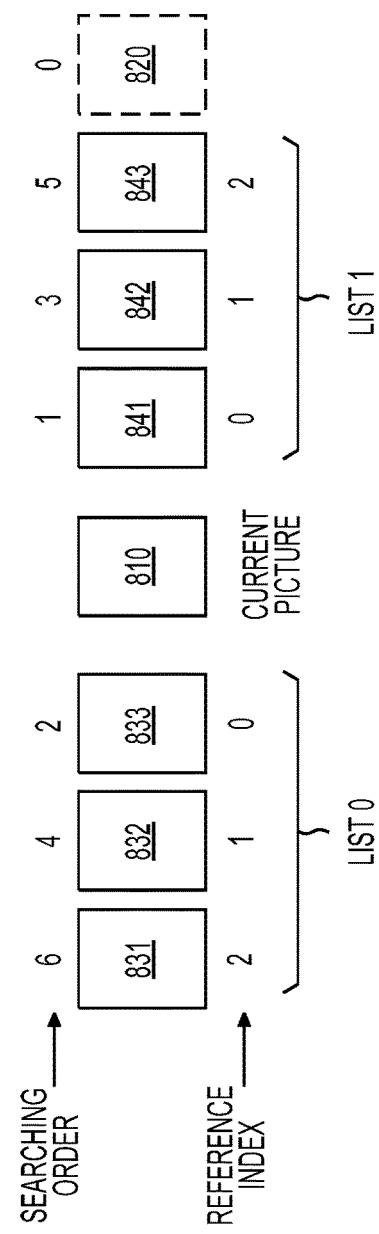
FIG. 8 shows an example searching order for searching for a main collocated reference picture during a process for processing a current PU with a sub-PU TMVP mode according to an embodiment of the disclosure.

FIG. 8 shows an example searching order for searching for a main collocated reference picture during a process for processing a current PU with a sub-PU TMVP mode according to an embodiment of the disclosure. In FIG. 8, a current picture 810 including the current PU, two reference picture list, List 0 and List 1 are illustrated. List 0 includes three reference pictures 831-833 having reference indexes 0, 1, and 2. List 1 includes three reference pictures 841-843 having reference indexes 0, 1, and 2. An initial reference picture 820 that is the reference picture associated with the initial motion vector is also shown. The initial reference picture 820 can be one of the pictures 831-833, and 841-843.

In FIG. 8 example, the searching order for searching for the main collocated reference picture is defined as follows. First, the initial reference picture 820 is searched. Then, the reference pictures 831-833 and 841-843 in two reference picture lists are searched in an interleaved manner and in a reference index increasing order. Specifically, the reference pictures in FIG. 8 are searched in such an order: 820, 841, 833, 842, 832, 843, and 831. The closer a main collocated picture is positioned to the current picture 810 in temporal distance, the higher correlation between the two pictures, and the better a quality of collocated motion information for sub-PUs of the current PU could be. Thus, the searching order defined in FIG. 8 example can result in a better result than the searching order of searching the two reference picture lists, List 0 and List 1 successively.

A searching order similar to that of the FIG. 8 example can be specified with the syntax element in the following way:

picture searched_i is specified as {1, do not care, do not care} when i=0;

picture searched_i is specified as {0, LA, (((i+1)/2)−1)} when i=1, 3, 5 . . . (odd integer); and picture searched_i is specified as {0, LB, ((i/2)−1)} when i=2, 4, 6 . . . (even integer).

In the above specification, the operation of (/2) represents an integer division (e.g., 1/2=0, 2/2=1, and so on). In the above specification, LA and LB can represent two different reference picture lists. For example, LA=List 0, LB=List 1 in one example, and LA=List 1, LB=List 0 in another example.

In one embodiment, a main collocated picture is determined at an encoder, and is subsequently signaled to a decoder. The determined main collocated picture can be a result of a collocated picture searching process, or can be preconfigured. Or, the determined collocated picture can be determined in other suitable methods. Accordingly, a syntax element can be signaled from the encoder to a decoder to directly indicate the main collocated picture. In other words, the main collocated picture can be signaled from an encoder to a decoder. Therefore, there is one collocated picture choice. The signal can be designed in sequence level, picture level, slice level, or PU level. In one example, the signaled main collocated picture is the reference picture associated with the initial motion vector. Thus, a syntax element {1, don not care, don not care} can be transmitted.

The processes and functions described herein can be implemented as a computer program which, when executed by one or more processors, can cause the one or more processors to perform the respective processes and functions. The computer program may be stored or distributed on a suitable medium, such as an optical storage medium or a solid-state medium supplied together with, or as part of, other hardware. The computer program may also be distributed in other forms, such as via the Internet or other wired or wireless telecommunication systems. For example, the computer program can be obtained and loaded into an apparatus, including obtaining the computer program through physical medium or distributed system, including, for example, from a server connected to the Internet.

Figure 9:
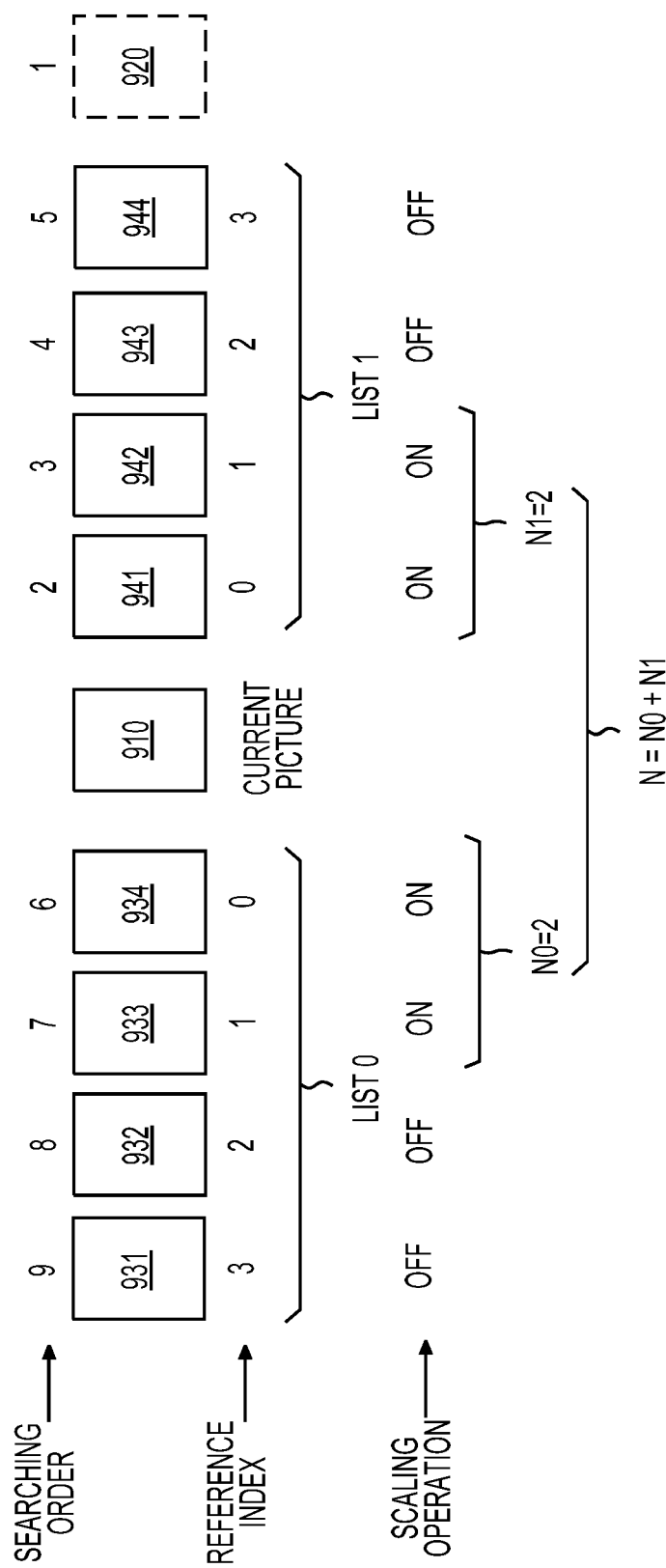
FIG. 9 shows a second example method of reducing computational cost related with motion vector scaling operations according to some embodiments of the disclosure.

FIG. 9 shows a second example method of reducing computational cost related with motion vector scaling operations according to some embodiments of the disclosure. Similar to the FIG. 7 example, another method is adopted for determining N number of reference pictures that are to be investigated with a motion vector scaling operation being performed (scaling operation being turned on) while searching for a main collocated picture of a current PU. In FIG. 9, a current picture 910 including the current PU, two reference picture lists, List 0 and List 1, of the current PU are shown. List 0 includes reference pictures 931-934 each having a respective index 0-3, and List 1 includes reference pictures 941-944 each having a respective index 0-3. An initial reference picture 920 that is a reference picture associated with an initial motion vector of the current PU is also shown. The initial reference picture 920 can be one of the pictures 931-934, and 941-944.

In a specific example, a searching order for the main collocated picture searching process is defined to be: 920, 941-944, and 934-931. In other words, the initial reference picture 920 is first searched, then List 1 in index increasing order, and List 0 in index increasing order. In alternative examples, the searching order for the main collocated picture searching process can be defined to be: 920, 934-932, and 941-944. After the initial reference picture 920 is first searched, List 0 is searched in index increasing order, then List 1 is searched in index increasing order. Which one of the above two searching orders is adopted can depend on certain conditions, or can be based on header information in a respective slice header or picture header carried in a coded bitstream.

The N number of reference pictures that are investigated with scaling operation turned ON is defined to be a first N0 number of reference pictures in the List 0, and a first N1 number of reference pictures in the List 1. In FIG. 9 example, N0=2, and N1=2. Accordingly, when the reference pictures 941-942 and 934-933 are investigated during the search, the scaling operation is turned on, and a scaling operation can be performed to obtain a scaled motion vector from an initial motion vector. Optionally, whether a being-investigated picture is the initial reference picture 920 can be examined. When a being-investigated picture is the initial reference picture 920, no scaling operation is performed, and the investigation for this picture can be completed. In contrast, for the reference pictures 943-944 and 932-931 that are not included in the first N0 or N1 number of reference pictures, the scaling operation can be turned off to save computational cost.

Generally, in order to save cost of motion vector scaling operations, N number of reference pictures in a sequence of to-be-searched reference pictures can be determined to be investigated with scaling operating being turned on while the other reference pictures in the sequence of to-be-searched reference pictures can be investigated with scaling operation being turned off. The N number of reference picture can be determined to be a first N number of the sequence of to-be-searched pictures as in the FIG. 7 example, or N number of reference pictures including a first portion (N0 number) and a second portion (N1 number) in two reference picture lists, List 0 and List 1. Alternatively, the N number can be determined in other manners different from the FIG. 7 or FIG. 9 example, for example, depending on how the reference picture lists are constructed, and depending how the searching order is adopted. In addition, the number N can also be variable depending on different scenarios, for example, depending on statistic of a current picture, or a size of a current PU, and the like.

The computer program may be accessible from a computer-readable medium providing program instructions for use by or in connection with a computer or any instruction execution system. The computer readable medium may include any apparatus that stores, communicates, propagates, or transports the computer program for use by or in connection with an instruction execution system, apparatus, or device. The computer-readable medium can be magnetic, optical, electronic, electromagnetic, infrared, or semiconductor system (or apparatus or device) or a propagation medium. The computer-readable medium may include a computer-readable non-transitory storage medium such as a semiconductor or solid state memory, magnetic tape, a removable computer diskette, a random access memory (RAM), a read-only memory (ROM), a magnetic disk and an optical disk, and the like. The computer-readable non-transitory storage medium can include all types of computer readable medium, including magnetic storage medium, optical storage medium, flash medium, and solid state storage medium.

While aspects of the present disclosure have been described in conjunction with the specific embodiments thereof that are proposed as examples, alternatives, modifications, and variations to the examples may be made. Accordingly, embodiments as set forth herein are intended to be illustrative and not limiting. There are changes that may be made without departing from the scope of the claims set forth below.

What is claimed is:

1. A video coding method for processing a current prediction unit (PU) with a sub-PU temporal motion vector prediction (TMVP) mode, comprising:
    receiving the current PU including sub-PUs;
    determining an initial motion vector that is a motion vector of a spatial neighboring block of the current PU;
    performing a searching process to search for a main collocated picture in a sequence of reference pictures of the current PU based on the initial motion vector, wherein the searching process includes,
        performing a motion vector scaling to scale the initial motion vector to obtain a scaled motion vector for investigating a subset of the sequence of reference pictures, and
        using the initial motion vector for investigating the other reference pictures in the sequence of reference pictures; and
    obtaining collocated motion information in the main collocated picture for the sub-PUs of the current PU.

2. The video coding method of claim 1, wherein the subset of the sequence of reference pictures includes one of:
    a first N number of the sequence of reference pictures in at least one of a first reference picture list of the current PU and a second reference picture list of the current PU excluding a reference picture associated with the initial motion vector when the reference picture associated with the initial motion vector is included in the first N number of the sequence of reference pictures; or
    a first N0 number of reference pictures in the first reference picture list of the current PU, and a first N1 number of reference pictures in the second reference picture list of the current PU excluding the reference picture associated with the initial motion vector when the reference picture associated with the initial motion vector is included in the first N0 or N1 number of the reference pictures,
    wherein the first and second reference picture lists are arranged in a reference index increasing order, and
    N, N0, and N1 are integer values greater than or equal to zero.

3. The video coding method of claim 1, wherein the motion vector scaling is based on a first temporal distance between a current picture including the current PU and the being-investigated one of the subset of the sequence of reference pictures, and a second temporal distance between the current picture including the current PU and a reference picture associated with the initial motion vector.

4. The video coding method of claim 1, wherein a reference picture associated with the initial motion vector in the sequence of reference pictures is investigated based on the initial motion vector.

5. The video coding method of claim 1, further comprising:
    determining a searching order for the searching process; and
    performing the searching process according to the determined searching order.

6. The video coding method of claim 1, further comprising:
    signaling or parsing a searching order for searching for the main collocated picture in the sequence of reference pictures of the current PU.

7. The video coding method of claim 1, further comprising:
    performing the searching process according to a searching order in which a reference picture associated with the initial motion vector is first searched, and reference pictures in two reference picture lists of the current PU are subsequently searched in an interleaved manner and in a reference index increasing order.

8. The video coding method of claim 1, further comprising:
    signaling or parsing the main collocated picture.

9. A video coding apparatus for processing a current prediction unit (PU) with a sub-PU temporal motion vector prediction (TMVP) mode, comprising circuitry configured to:
  receive the current PU including sub-PUs;
  determine an initial motion vector that is a motion vector of a spatial neighboring block of the current PU;
  perform a searching process to search for a main collocated picture in a sequence of reference pictures of the current PU based on the initial motion vector, wherein the searching process includes,
    perform a motion vector scaling to scale the initial motion vector to obtain a scaled motion vector for investigating a subset of the sequence of reference pictures, and
    using the initial motion vector for investigating the other reference pictures in the sequence of reference pictures; and
  obtain collocated motion information in the main collocated picture for the sub-PUs of the current PU.

10. The video coding apparatus of claim 9, wherein the subset of the sequence of reference pictures include one of:
  a first N number of the sequence of reference pictures in at least one of a first reference picture list of the current PU and a second reference picture list of the current PU excluding a reference picture associated with the initial motion vector when the reference picture associated with the initial motion vector is included in the first N number of the sequence of reference pictures; or
  a first N0 number of reference pictures in the first reference picture list of the current PU, and a first N1 number of reference pictures in the second reference picture list of the current PU excluding the reference picture associated with the initial motion vector when the reference picture associated with the initial motion vector is included in the first N0 or N1 number of the reference pictures,
  wherein the first and second reference picture lists are arranged in a reference index increasing order, and
  N, N0, and N1 are integer values greater than or equal to zero.

11. The video coding apparatus of claim 9, wherein the motion vector scaling is based on a first temporal distance between a current picture including the current PU and the being-investigated one of the subset of the sequence of reference pictures, and a second temporal distance between the current picture including the current PU and a reference picture associated with the initial motion vector.

12. The video coding apparatus of claim 9, wherein a reference picture associated with the initial motion vector in the sequence of reference pictures is investigated based on the initial motion vector.

13. The video coding apparatus of claim 9, wherein the circuitry is further configured to:
  determine a searching order for the searching process; and
  perform the searching process according to the determined searching order.

14. The video coding apparatus of claim 9, wherein the circuitry is further configured to:
  signal or parsing a searching order for searching for the main collocated picture in the sequence of reference pictures of the current PU.

15. The video coding apparatus of claim 9, wherein the circuitry is further configured to:
  perform the searching process according to a searching order in which a reference picture associated with the initial motion vector is first searched, and reference pictures in two reference picture lists of the current PU are subsequently searched in an interleaved manner and in a reference index increasing order.

16. A non-transitory computer-readable medium storing instructions which, when executed by a processor, cause the processor to perform a video coding method for processing a current prediction unit (PU) with a sub-PU temporal motion vector prediction (TMVP) mode, the method comprising:
  receiving the current PU including sub-PUs;
  determining an initial motion vector that is a motion vector of a spatial neighboring block of the current PU;
  performing a searching process to search for a main collocated picture in a sequence of reference pictures of the current PU based on the initial motion vector, wherein the searching process includes,
    performing a motion vector scaling to scale the initial motion vector to obtain a scaled motion vector for investigating a subset of the sequence of reference pictures, and
    using the initial motion vector for investigating the other reference pictures in the sequence of reference pictures; and
  obtaining collocated motion information in the main collocated picture for the sub-PUs of the current PU.

* * * * *